(12) United States Patent
Kim et al.

(10) Patent No.: US 10,718,432 B2
(45) Date of Patent: Jul. 21, 2020

(54) METHOD FOR CONTROLLING SHIFTING BY WIRE TRANSMISSION VEHICLE

(71) Applicants: Hyundai Motor Company, Seoul (KR); Kia Motors Corporation, Seoul (KR)

(72) Inventors: Young Suk Kim, Seoul (KR); Jung Min Lim, Gyeongju-si (KR); Kyeong Won Jeon, Seoul (KR)

(73) Assignees: Hyundai Motor Company, Seoul (KR); Kia Motors Corporations, Seoul (KR)

( * ) Notice: Subject to any disclaimer, the term of this patent is extended or adjusted under 35 U.S.C. 154(b) by 142 days.

(21) Appl. No.: 16/169,883

(22) Filed: Oct. 24, 2018

(65) Prior Publication Data
US 2020/0018394 A1    Jan. 16, 2020

(30) Foreign Application Priority Data

Jul. 11, 2018 (KR) .......................... 10-2018-0080322

(51) Int. Cl.
F16H 63/34    (2006.01)
F16H 59/10    (2006.01)
F16H 61/32    (2006.01)

(52) U.S. Cl.
CPC ....... *F16H 63/3458* (2013.01); *F16H 59/105* (2013.01); *F16H 2061/326* (2013.01)

(58) Field of Classification Search
None
See application file for complete search history.

(56) References Cited

U.S. PATENT DOCUMENTS

| | | | |
|---|---|---|---|
| 7,490,528 B2 * | 2/2009 | Koski | F16H 59/08 192/219.5 |
| 7,954,394 B2 * | 6/2011 | Yoshioka | F16H 63/3483 74/335 |
| 8,985,294 B2 * | 3/2015 | Schindler | F16H 63/3483 192/219.4 |
| 9,114,790 B2 * | 8/2015 | Kinch | B60T 11/10 |
| 9,772,033 B2 * | 9/2017 | McDonough | F16H 61/0021 |
| 9,856,980 B2 * | 1/2018 | Tachibanada | F16H 61/12 |
| 2008/0227595 A1 * | 9/2008 | Pfister | F16H 63/3483 477/48 |

FOREIGN PATENT DOCUMENTS

| | | |
|---|---|---|
| JP | 2004-352086 A | 12/2004 |
| KR | 10-2011-0062615 A | 6/2011 |
| KR | 10-1380524 B1 | 4/2014 |
| KR | 10-2014-0077054 A | 6/2014 |

* cited by examiner

*Primary Examiner* — Dirk Wright
(74) *Attorney, Agent, or Firm* — Morgan, Lewis & Bockius LLP

(57) ABSTRACT

A method for controlling a shift-by-wire (SBW) transmission may include detecting whether a shut-down condition is met in a state in which a parking gear stage of a vehicle is released, when it is detected that the shut-down condition is met, starting to drive a parking release device of maintaining release of a parking gear on the basis of an oil pressure of a parking piston or an RPM of an engine, and controlling an ON/OFF duty ratio of electric power of driving the parking release device on the basis of oil pressure of the parking piston, after starting to drive the parking release device.

17 Claims, 4 Drawing Sheets

METHOD FOR CONTROLLING SHIFTING BY WIRE TRANSMISSION VEHICLE

CROSS REFERENCE TO RELATED APPLICATION

The present application claims priority to Korean Patent Application No. 10-2018-0080322, filed Jul. 11, 2018, the entire contents of which is incorporated herein for all purposes by this reference.

BACKGROUND OF THE INVENTION

Field of the Invention

The present invention relates to a method for controlling a shifting-by-wire (SBW) transmission vehicle, and more particularly, to a control method for preventing automatic shifting of a SBW transmission vehicle to a parking gear stage when shutting down the SBW transmission vehicle.

Description of Related Art

In conventional vehicles, a mechanical link coupling structure is applied to a lever (gear stick) and a transmission through a cable or a shaft, but a SBW transmission (or e-shifter transmission) which converts a transmission operation signal input by a driver into an electrical signal and transmits the converted electrical signal to a transmission control unit (TCU) so that the TCU actually changes speeds by operating a transmission according to the transmission operation signal of the driver and driving conditions of a vehicle has been developed as a new technology replacing the mechanical automatic transmissions.

In the SBW transmission, since the transmission is controlled by an electrical signal, a transmission control device may not be limited to a conventional gear stick type. Thus, the transmission control device of the SBW transmission may be configured as a button type as well as a conventional gear stick type.

The SBW transmission has various advantages such as improved performance of noise, vibration, and harshness (NVH) and improved operation performance, as well as advantages of space utilization.

In particular, in the SBW transmission, when an engine operates normally while a vehicle is running, a transmission oil pump is driven by a rotational force of the engine to form oil pressure of automatic transmission fluid (ATF). However, when shutting down the vehicle, the transmission oil pump, which is operated by engine power, is stopped and the oil pressure of the ATF is removed, automatically shifting to a parking gear stage ("P" in a shift pattern) due to a reduction of the ATF in a parking piston.

However, when shutting down the vehicle by an idle-stop-and-go (ISG) function in the case of temporary stop at the driving (or forward) gear stage (D) or when shutting down the vehicle at a neutral gear stage (N), the corresponding gear stage needs to be maintained but the transmission oil pump driven by the engine is automatically stopped, causing automatic gear shifting to the parking gear stage (P).

To solve the present problem, a technique of adding an apparatus such as an electric oil pump (EOP) for maintaining oil pressure of a transmission using an electric motor to maintain a running gear stage even when shutting down the vehicle with the running gear stage (D), a parking release actuator (PRA) for maintaining release of the parking gear stage (P) so that parking may be performed at the neutral gear stage (N), and the like, has been developed.

However, although an electric oil pump is used, oil pressure of the electric oil pump is insufficient, causing the parking gear stage (P) to be instantaneously locked when shutting down the vehicle to cause a controller to malfunction. Although a parking release actuator is used, the parking gear stage is locked instantaneously when shutting down the vehicle due to an insufficient actuating force (torque) of the parking release actuator, causing ignition (IGN) electric power to transition to Off electric power, rather than to Acc electric power, when shutting down the vehicle.

To prevent the problem that the parking gear stage (P) is instantaneously locked when shutting down the vehicle, a control method of generating time delay to stop an engine or increasing an RPM of the engine during a predetermined time period, for maintaining power of the transmission oil pump, has been developed, but such a control method deteriorates fuel efficiency and involves a risk of battery discharge because the electric oil pump is driven or a parking release actuator is driven using battery electric power in a state in which shutting down the vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a technique of preventing malfunction of automatically shifting to a parking gear stage instantaneously when shutting down a vehicle provided with a shift-by-wire (SBW) transmission and effectively using battery electric power, while maintaining fuel efficiency to the maximum.

According to an exemplary embodiment of the present invention, a method for controlling a shift-by-wire (SBW) transmission may include: detecting whether a shut-down condition is met in a state in which a parking gear stage of a vehicle is released; when it is detected that the shut-down condition is met, starting to drive a parking release device of maintaining release of a parking gear on the basis of an oil pressure of a parking piston or an RPM of an engine; and controlling an ON/OFF duty ratio of electric power of driving the parking release device on the basis of oil pressure of the parking piston, after starting to drive the parking release device.

The method may further include: when driving of the engine is terminated before the starting to drive the parking release device, periodically receiving engine RPM information and determining whether the engine RPM is lower than a predetermined minimum engine RPM using the received engine RPM information, wherein, in the starting to drive the parking release device, when it is determined that the engine RPM is lower than the minimum engine RPM, the parking release device starts to be driven.

The method may further include: estimating an engine stop timing at which the engine is completely stopped using the received engine RPM information, before the starting to drive the parking release device, wherein, in the starting to drive the parking release device, the parking release device may start to be driven before the estimated engine stop timing.

The predetermined minimum engine RPM may be previously determined as an engine RPM for generating a minimum oil pressure for the parking piston to maintain release of the parking gear stage.

The method may further include: before the starting to drive the parking release device, periodically receiving oil pressure information related to the parking piston when the oil pressure of the parking piston is lower than a predetermined reference oil pressure and determining whether the oil pressure of the parking piston is lower than a predetermined minimum oil pressure using the received oil pressure information related to the parking piston, wherein, in the starting to drive the parking release device, when it is determined that the oil pressure of the parking piston is lower than the predetermined minimum oil pressure, the parking release device may start to be driven.

The method may further include: before the starting to drive the parking release device, estimating an oil pressure removal timing at which oil pressure of the parking piston is completely removed using the received oil pressure information related to the parking piston, wherein, in the starting to drive the parking release device, the parking release device starts to be driven before the estimated oil pressure removal timing.

The predetermined reference oil pressure may be previously determined as a minimum oil pressure maintained at the parking piston while the engine is being driven.

The predetermined minimum oil pressure may be previously determined as a minimum oil pressure for the parking piston to maintain release of the parking gear stage.

The controlling of the ON/OFF duty ratio of electric power may be controlling to increase the ON/OFF duty ratio until an oil pressure of the parking piston is equal to or greater than the predetermined minimum oil pressure.

The method may further include: boosting electric power for driving the parking release device, when the ON/OFF duty ratio is increased to 100% in the controlling of the ON/OFF duty ratio of electric power.

The controlling of the ON/OFF duty ratio of electric power may be controlling to reduce the ON/OFF duty ratio when the oil pressure of the parking piston exceeds the predetermined minimum oil pressure.

The parking release device may be an electric oil pump (EOP) providing oil pressure to the parking piston or a parking release actuator (PRA) providing power to a parking release lever for preventing release of parking.

The method may further include: detecting whether a re-starting condition is met, after the controlling of the ON/OFF duty ratio of electric power; and when the re-starting condition is met, terminating driving of the parking release device on the basis of oil pressure of the parking piston or the engine RPM.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
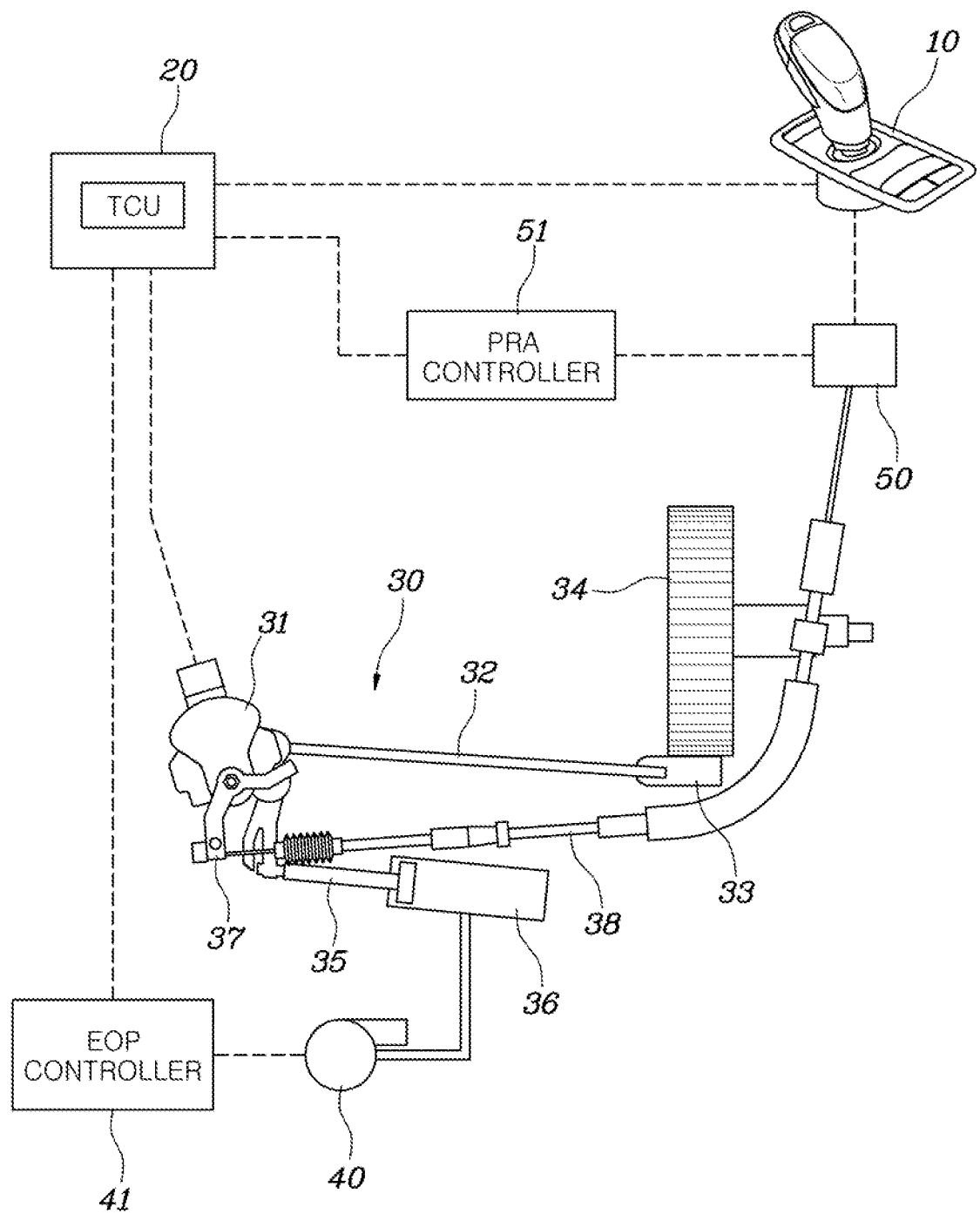
FIG. 1 is a view illustrating a system configuration of a shift-by-wire (SBW) transmission vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural or functional descriptions of embodiments of the present invention included in the present specification or application are illustrated for describing embodiments of the present invention. Embodiments of the present invention may be implemented in various forms and may not be construed to be limited to the exemplary embodiments of the present invention or application.

The exemplary embodiments of present invention may be modified variably and may have various embodiments, particular examples of which will be illustrated in drawings and described in detail. However, it is to be understood that the present invention is not limited to a specific included form, but includes all modifications, equivalents, and substitutions without departing from the scope and spirit of the present invention.

Terms such as "'first", "'second", etc., may be used to describe various components, but the components are not to be construed as being limited to the terms. The terms are used to distinguish one component from another component. For example, the "'first" component may be named the "'second" component and the "'second" component may also be similarly named the "'first" component, without departing from the scope of the present invention.

It is to be understood that when one element is referred to as being "connected to" or "coupled to" another element, it may be directly connected to or coupled directly to another element or be connected to or coupled to another element, having the other element intervening therebetween. On the other hand, it is to be understood that when one element is referred to as being "directly connected to" or "coupled directly to" another element, it may be connected to or coupled to another element without the other element intervening therebetween. Other expressions describing a relationship between components, that is, "between", "directly between", "neighboring to", "directly neighboring to" and the like, may be similarly interpreted.

Terms used in the exemplary embodiment are used only to describe specific exemplary embodiments rather than limiting the present invention. Singular forms are intended to include plural forms unless the context clearly indicates otherwise. It will be further understood that the terms "comprises" or "have" used in the exemplary embodiment, specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification, including technical and scientific terms have the same meaning as those that are understood by those skilled in the art to which the present invention pertains. It may be understood that the terms defined by the dictionary are identical with the meanings within the context of the related art, and they may not be ideally or excessively formally defined unless the context clearly dictates otherwise.

Hereinafter, exemplary embodiments of the present invention will be described in detail with reference to the accompanying drawings. Throughout the accompanying drawings, the same reference numerals indicate the same members.

FIG. 1 illustrates a system configuration of a shift-by-wire (SBW) transmission vehicle according to an exemplary embodiment of the present invention.

Referring to FIG. 1, the system of the SBW transmission vehicle system includes a shifting lever 10, a transmission control unit (TCU) 20, a parking gear 34, and devices for locking or releasing these components.

The shifting lever 10 detects a gear stage operated by a user using an electronic lever or a button, converts the same into an electrical signal, and transfers the electrical signal to the TCU 20.

The TCU 20 controls a gear stage of the transmission according to the gear stage operation signal transferred from the shifting lever 10. Also, the TCU 20 is connected to a higher controller such as an electronic control unit (ECU) to control the gear stage in accordance with shutting down the vehicle according to an ignition (IGN) Off signal from the user or shutting down according to an idle stop and go (ISG) function.

In the case of a parking gear stage, the TCU 20 controls a parking device 30 to lock the parking gear 34. The TCU 20 is connected to a parking switch 31 and controls the parking switch 31 to move a parking rod 32 in a direction of locking or releasing the parking rod 32 upon receiving a lock or release signal of the parking gear stage of the TCU 20. The parking rod 32 controls a parking sprag 33, a protrusion engaged with which the parking gear, to lock or release the parking gear 34 to lock or release the parking gear 34 through a linear motion.

The parking rod 32 is moved by a force based on a parking hydraulic cylinder 36 and a parking piston 35. The parking rod 32 is moved in a direction in which parking is locked by an elastic force of a spring located between the parking hydraulic cylinder 36 and the parking piston 35. When an oil pressure stronger than the elastic force is generated in the parking piston 35, the parking rod 32 is moved in a direction in which parking is released.

An automatic transmission fluid (ATF), which is supplied as a transmission oil pump is driven, forms an oil pressure between the parking hydraulic cylinder 36 and the parking piston 35. The transmission oil pump is driven by power from an engine, and thus, oil pressure of the transmission oil pump is removed if shutting down the vehicle and the engine is not driven.

Therefore, the parking switch 31 may be further provided with a parking release device. The parking release device may include an electric oil pump (EOP) 40 and a parking release actuator (PRA) 50.

The electric oil pump 40 is connected to the parking hydraulic cylinder 36 and the parking piston 35 to form oil pressure using electric power from a battery, or the like, although driving of the engine is terminated and the transmission oil pump is not driven. The electric oil pump 40 is controlled by an EOP controller 41 receiving a signal by the TCU 20.

Also, the parking release actuator 50 may rotate the parking release lever 37 connected via a PRA cable 38 to generate a driving force so that the parking rod 32 releases locking of the parking gear 34. The parking release actuator 50 may prevent automatic changing to a parking gear stage when shutting down the vehicle with gear stages other than the parking gear stage, using electric power of the battery. Further, when the user operates a parking release button positioned in the shifting lever in the shutting down the vehicle, the parking release actuator 50 may perform control such that the parking shift stage is released. The parking release actuator 50 is controlled by a PRA controller 51 which receives a signal by the TCU 20.

Figure 2:
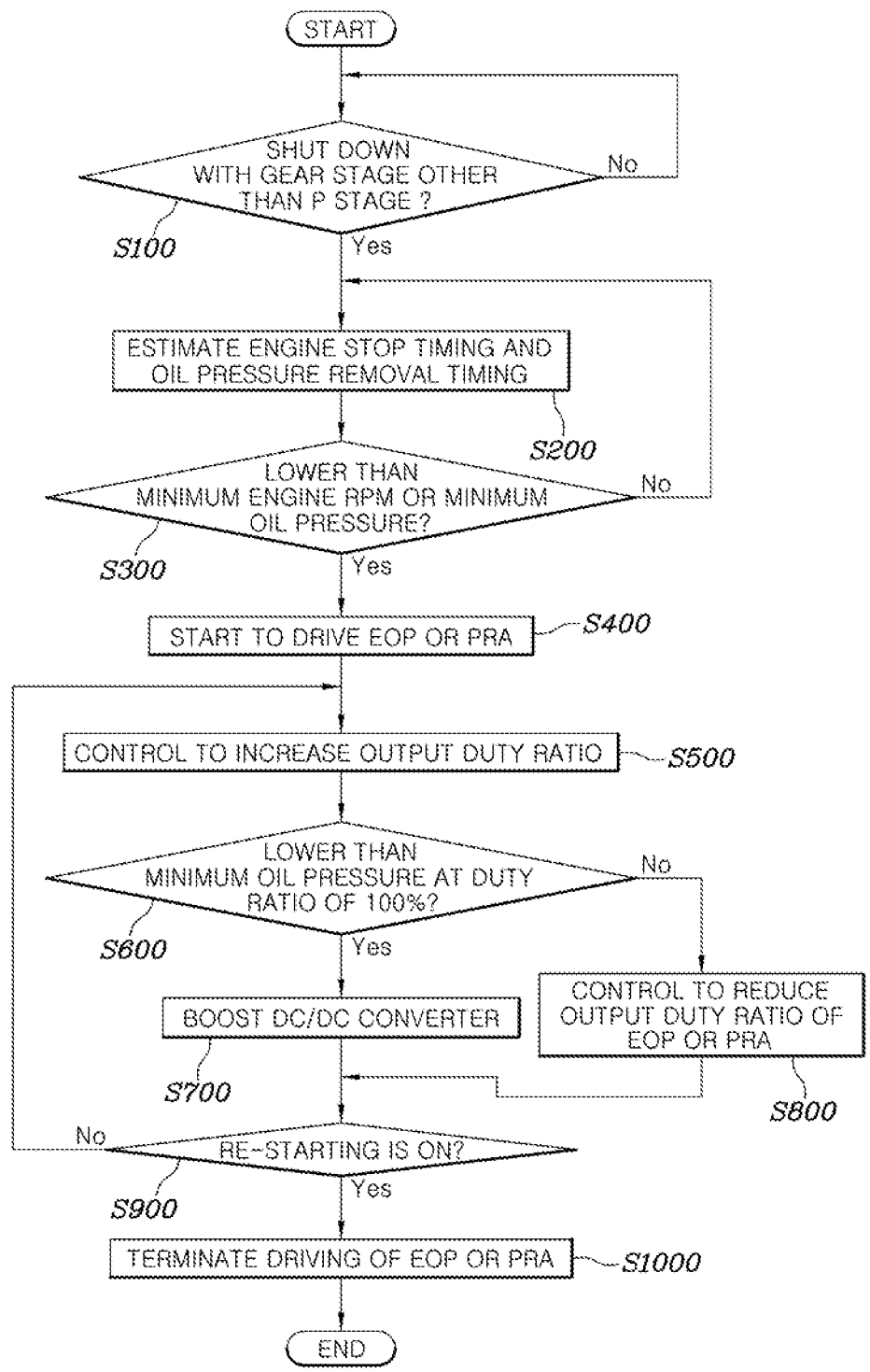
FIG. 2 is a flowchart of a method for controlling an SBW transmission vehicle according to an exemplary embodiment of the present invention.

FIG. 2 is a flowchart of a method for controlling a SBW transmission vehicle according to an exemplary embodiment of the present invention.

Referring to FIG. 2, a method of controlling an SBW transmission vehicle according to an exemplary embodiment of the present invention includes detecting whether a shut-down condition is met in a state in which a parking gear stage of a vehicle is released (S100), when it is detected that the shut-down condition is met, starting to drive a parking release device of maintaining release of a parking gear 34 on the basis of an oil pressure of a parking piston 35 or an RPM of an engine (S400), and controlling an ON/OFF duty ratio of electric power of driving the parking release device on the basis of oil pressure of the parking piston 35, after starting to drive the parking release device (S500).

A state in which the parking gear stage is released refers to a state in which a gear stage of a driving gear stage (D), a reverse gear stage (R), or a neutral gear stage (N), rather than the parking gear stage (P), is maintained, and, unlike a normal parking situation, the parking gear stage is released and locking of the parking gear 34 is released, in which a shut-down condition is met.

In step S100 of detecting whether the shut-down is met, the shut-down condition may be detected through an ignition (IGN) OFF operation or whether an ISG function is operated. That is, both a case where the user operates ignition from ON to OFF and a case where shutting down the vehicle in a state of being stopped by the ISG function, rather than by a user's intention may be detected.

When it is detected that the shut-down condition is satisfied, driving of the engine is stopped to reduce engine RPM, and accordingly, driving of the transmission oil pump is completed to reduce oil pressure of the parking piston 35.

That is, a parking release device configured for monitoring a decreasing engine RPM or oil pressure of the parking piston 35 and maintaining the release of the parking gear 34 on the basis of the oil pressure of the parking piston 35 or the engine RPM may be controlled to start driving.

After starting to drive the parking release device, the ON/OFF duty ratio of electric power for driving the parking release device may be controlled on the basis of the oil pressure of the parking piston 35.

The parking release device may be an electric oil pump (EOP) that provides oil pressure to the parking piston 35 or a parking release actuator (PRA) 50 that provides power to a parking release lever 37 to prevent parking release.

Thus, a malfunction that the vehicle is erroneously locked to the parking gear stage due to driving of the parking release device when shutting down the vehicle in a state in which the parking gear stage is released may be prevented.

Figure 3:
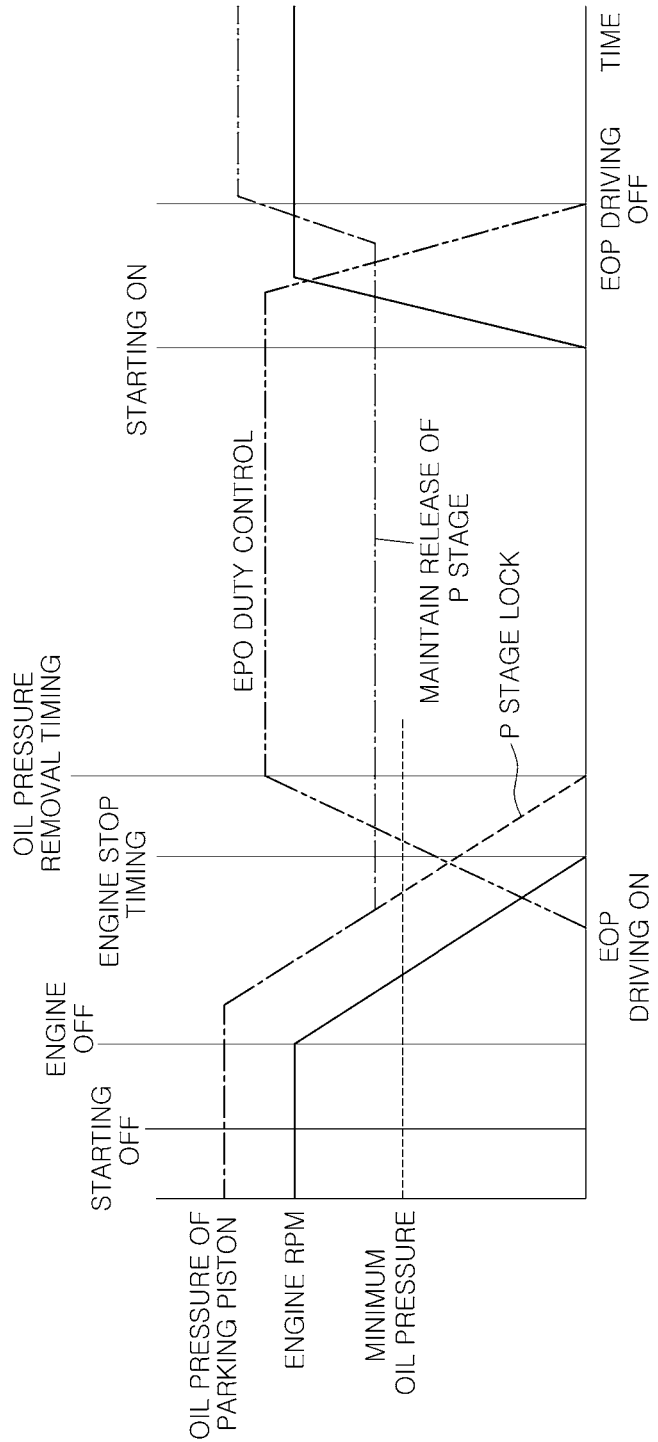
FIG. 3 and FIG. 4 are control timing diagrams of an SBW transmission vehicle according to an exemplary embodiment of the present invention.
Figure 4:
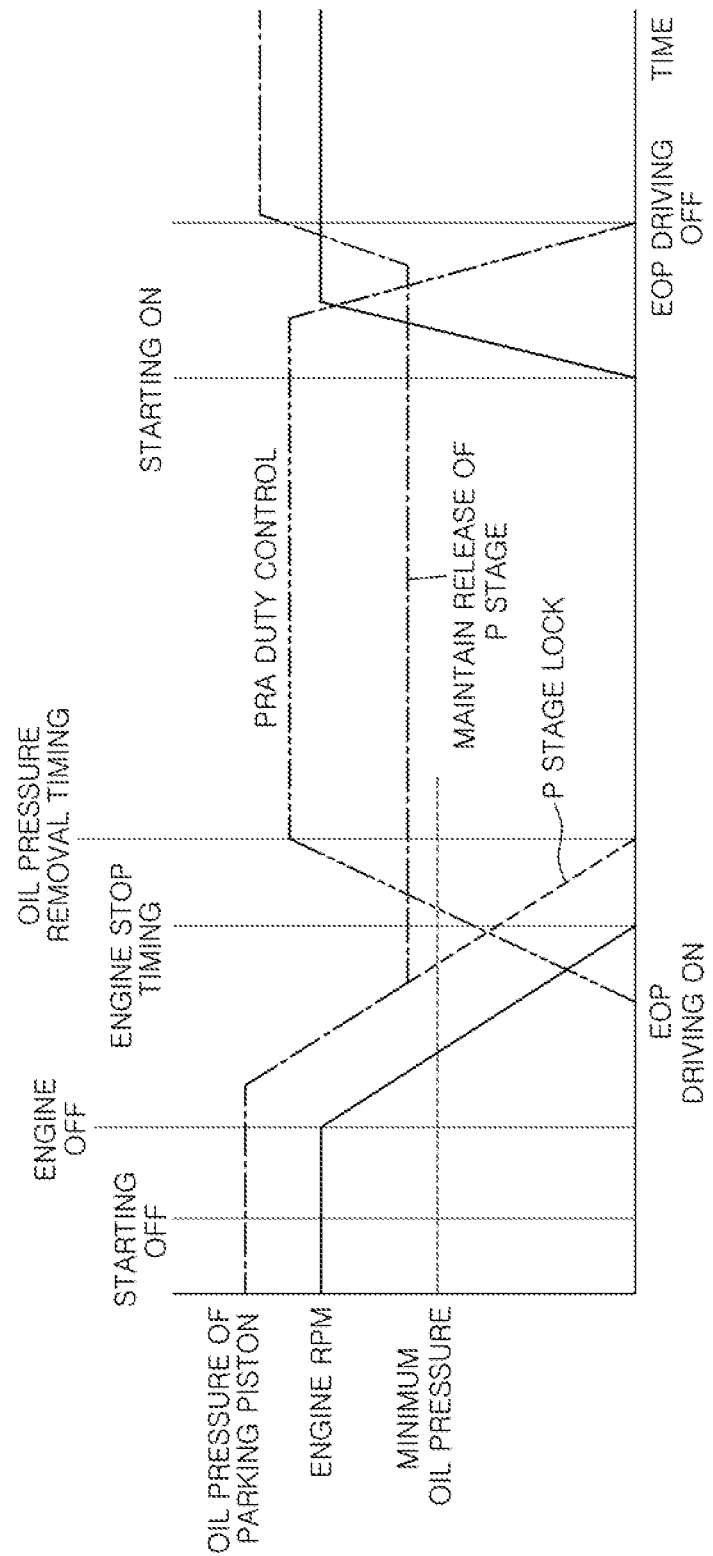

FIG. 3 and FIG. 4 are control timing diagrams of an SBW transmission vehicle according to an exemplary embodiment of the present invention.

Referring to FIG. 3 and FIG. 4, after a predetermined time period has elapsed after the shut-down condition is met, driving of the engine is stopped and the RPM of the engine starts to decrease.

The method may further include: when driving of the engine is terminated before the starting to drive the parking release device (S400), periodically receiving engine RPM information and determining whether the engine RPM is equal or lower than a predetermined minimum engine RPM using the received engine RPM information (S300), and, in the starting to drive the parking release device (S400), when it is determined that the engine RPM is lower than the minimum engine RPM, the parking release device starts to be driven.

When the RPM of the engine starts to decrease, it may be determined that the driving of the engine has been terminated and the engine RPM information may be periodically received. That is, a processor disposed in the vehicle may receive the RPM signal of the engine at a task period (e.g., 10 [ms]).

It may be determined that the engine RPM is lower than the predetermined minimum engine RPM using the received engine RPM information, and in step (S400) of starting to drive the parking release device, if the engine RPM is determined to be equal or lower than the minimum engine RPM, the parking release device may start to drive.

The predetermined minimum engine RPM is previously determined as an engine RPM for generating a minimum oil pressure for the parking piston 35 to maintain release of the parking gear stage. That is, the predetermined minimum engine RPM may be previously determined as an engine RPM measured in a state in which oil pressure applied to the parking piston 35 is the minimum oil pressure for maintaining release of the parking gear stage.

The method may further include: estimating an engine stop timing at which the engine is completely stopped using the received engine RPM information (S200), before the starting to drive the parking release device (S400), and, in the starting to drive the parking release device (S400), the parking release device may start to be driven before the estimated engine stop timing.

That is, the engine stop timing at which the engine is completely stopped so that the RPM of the engine is zero may be estimated by determining a change in the RPM during a periodic time using the periodically received engine RPM information. For example, when the engine RPM is received at the cycle of 10 [ms], the engine stop timing may be estimated by determining an average of variations of the engine RPM for 100 [ms].

The parking release device may be controlled to start driving before the estimated engine stop timing. That is, the parking release device may be controlled to start driving at the latest before the engine is completely stopped.

The method may further include, before the starting to drive the parking release device (S400), periodically receiving oil pressure information related to the parking piston 35 when the oil pressure of the parking piston 35 is lower than a predetermined reference oil pressure and determining whether the oil pressure of the parking piston 35 is lower than the predetermined minimum oil pressure using the received oil pressure information related to the parking piston 35, and, in the starting to drive the parking release device, when it is determined that the oil pressure of the parking piston 35 is lower than the predetermined minimum oil pressure, the parking release device may start to be driven.

The predetermined reference oil pressure may be previously determined as the minimum oil pressure maintained at the parking piston 35 while the engine is driven. That is, the predetermined reference oil pressure is previously determined as the minimum oil pressure applied to the parking piston 35 according to the minimum RPM during the operation of the engine. If the oil pressure of the parking piston 35 is lower than the predetermined reference oil pressure, it may be determined that driving of the engine is terminated.

When it is determined that the oil pressure of the parking piston 35 is lower than the predetermined reference oil pressure and the driving of the engine is terminated, the oil pressure information related to the parking piston 35 is periodically received and it may be determined whether the oil pressure of the parking piston 35 is lower than a predetermined minimum oil pressure using the received oil pressure information related to the parking piston 35.

A separate sensor for measuring oil pressure of oil inside the parking hydraulic cylinder 36 applied to the oil pressure piston 35 may be provided and the oil pressure information related to the parking piston 35 may be periodically received. The oil pressure information related to the parking piston 35 may also be received at a task cycle (i.e., 10 [ms]) of the processor disposed in the vehicle.

The predetermined minimum oil pressure may be previously determined to the minimum oil pressure for the parking piston 35 to maintain release of the parking gear stage. That is, the predetermined minimum oil pressure may be a minimum oil pressure which is previously determined through experimentation and maintained, at which oil pressure of the parking piston 35 is reduced so that the parking gear stage may not be automatically locked.

The method may further include: before the starting to drive the parking release device (S400), estimating an oil pressure removal timing at which oil pressure of the parking piston 35 is completely removed using the received oil pressure information related to the parking piston (S200), and, in the starting to drive the parking release device (S400), the parking release device starts to be driven before the estimated oil pressure removal timing.

That is, an oil pressure removal timing at which the oil pressure of the parking piston 35 is completely removed may be estimated by determining a change in oil pressure of the parking piston 35 during a periodical time using the periodically received oil pressure information related to the parking piston 35. For example, when the oil pressure of the parking piston 35 is received at the cycle of 10 [ms], the oil pressure removal timing may be estimated by determining an average of variations of the oil pressure of the parking piston 35 for 100 [ms].

The parking release device may be controlled to start driving before the estimated oil pressure removal timing.

That is, the parking release device may be controlled to start driving at the latest before the oil pressure is completely stopped.

In step S500 of controlling an ON/OFF duty ratio of electric power, the ON/OFF duty ratio may be increased until the oil pressure of the parking piston 35 is equal to or greater than the predetermined minimum oil pressure.

In an exemplary embodiment of the present invention, the ON/OFF duty ratio of the electric oil pump 40 in the parking device 30 may be controlled.

The parking release device is connected to an electric power storage device such as a battery and driven upon being supplied with electric power stored in a shut-down state. When the parking release device starts driving, the ON/OFF duty ratio of electric power supplied to the parking release device may be controlled to be increased. Here, the ON/OFF duty ratio refers to a ratio of a pulse width modulation (PWM) output ON duty of an inverter supplying electric power to the parking release device.

The ON/OFF duty ratio may be controlled to be increased until oil pressure of the parking piston 35 is equal to or greater than a predetermined minimum oil pressure, and may be controlled to be increases to an ON/OFF duty ratio of up to 100[%] (S600). The predetermined minimum oil pressure may be previously determined to a minimum oil pressure for the parking piston 35 to maintain the release of the parking gear stage.

If the ON/OFF duty ratio is increased to 100% in step S500 of controlling the on/off duty ratio of the electric power (S600), step (S700) of boosting electric power to be driven by the parking release device may be further included. A converter (DC/DC converter) for boosting electric power supplied from the battery is provided between the battery and the parking release device to boost the electric power of the battery. Therefore, the converter may be controlled to raise the driving voltage for driving the parking release device.

That is, if the oil pressure of the parking piston 35 does not reach the predetermined minimum oil pressure although the ON/OFF duty ratio is increased to 100[%], electric power for driving the parking release device may be boosted using the converter.

In contrast, in the controlling of the ON/OFF duty ratio of electric power (S500), if the oil pressure of the parking piston 35 exceeds the predetermined minimum oil pressure (S600), the ON/OFF duty ratio may be controlled to be decreased (S800).

That is, although the ON/OFF duty ratio is not increased to 100[%], if the oil pressure of the parking piston 35 exceeds the predetermined minimum oil pressure (S600), the ON/OFF duty ratio may be controlled again to be reduced (S800). Thus, since the oil pressure of the parking piston 35 is controlled to be converged on the predetermined minimum oil pressure, electric power which may be wasted by controlling the oil pressure of the parking piston 35 to exceed the predetermined minimum oil pressure may be minimized.

The method may further include: detecting whether a re-starting condition is met (S900), after the controlling of the ON/OFF duty ratio of electric power (S500); and when the re-starting condition is met, terminating driving of the parking release device on the basis of oil pressure of the parking piston 35 or the engine RPM (S1000).

Whether the re-starting condition is met may include a case where a condition for releasing the ISG function is met or a case where the user operates the IGN from OFF to ON.

When it is detected that the re-starting condition is met, the driving of the parking release device may be terminated on the basis of the oil pressure of the parking piston 35 or the engine RPM. If the driving of the parking release device is terminated immediately after the restarting condition is met, a problem that the parking gear stage is erroneously locked may arise.

Thus, it may be controlled such that the driving of the parking release device is terminated on the basis of the oil pressure of the parking piston 35 or the engine RPM, when it is detected that the engine RPM has been increased to the predetermined minimum RPM or greater or the oil pressure of the parking piston 35 is increased the predetermined minimum oil pressure or higher, the driving of the parking release device may be terminated.

According to the method for controlling an SBW transmission vehicle of the present invention, a malfunction that the vehicle erroneously shifts to the parking gear stage (P) according to loss of oil pressure of the transmission oil pump when the SBW transmission vehicle is turned off is prevented.

Furthermore, since time delay does not occur or since the engine RPM is not increased for a predetermined time period when the engine is stopped to prevent malfunction that the SBW transmission vehicle is erroneously shifted to the parking gear stage (P) when the vehicle is turned off, fuel efficiency may be increased.

Furthermore, the use of electric power when driving the electric oil pump (EOP) or the parking release actuator (PRA) is optimized to minimize electric power consumption of the battery, preventing discharge of the battery.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling shifting by wire transmission vehicle, the method comprising:

detecting, by a controller, when a shut-down condition is met in a state in which a parking gear stage of the vehicle is released;

when it is by the controller, detected that the shut-down condition is met, starting by the controller to drive a parking release device of maintaining release of a parking gear on a basis of an oil pressure of a parking piston or a revolution per minute (RPM) of an engine; and controlling by the controller, an ON/OFF duty ratio of electric power of driving the parking release device on a basis of the oil pressure of the parking piston, after starting to drive the parking release device.

2. The method of claim 1, further including:
when driving of the engine is terminated before the starting to drive the parking release device, periodically receiving engine RPM information and determining when the RPM of the engine is equal or lower than a predetermined minimum engine RPM using the received engine RPM information,
wherein, in the starting to drive the parking release device, when the controller determines that the RPM of the engine is lower than the predetermined minimum engine RPM, the controller is configured to start to drive the parking release device.

3. The method of claim 2, further including:
estimating an engine stop timing at which the engine is completely stopped using the received engine RPM information, before the starting to drive the parking release device,
wherein, in the starting to drive the parking release device, the controller is configured to start to drive the parking release device before the estimated engine stop timing.

4. The method of claim 2, wherein the predetermined minimum engine RPM is preset as a RPM of the engine for generating a minimum oil pressure for the parking piston to maintain the release of the parking gear stage.

5. The method of claim 2, further including:
before the starting to drive the parking release device, periodically receiving oil pressure information related to the parking piston when the oil pressure of the parking piston is lower than a predetermined reference oil pressure and determining whether the oil pressure of the parking piston is lower than the predetermined minimum oil pressure using the received oil pressure information related to the parking piston,
wherein, in the starting to drive the parking release device, when the controller determines that the oil pressure of the parking piston is lower than the predetermined minimum oil pressure, the controller is configured to start to drive the parking release device.

6. The method of claim 5, further including:
before the starting to drive the parking release device, estimating an oil pressure removal timing at which the oil pressure of the parking piston is completely removed using the received oil pressure information related to the parking piston,
wherein, in the starting to drive the parking release device, the controller is configured to start to drive the parking release device before the estimated oil pressure removal timing.

7. The method of claim 5, wherein the predetermined reference oil pressure is preset as a minimum oil pressure maintained at the parking piston while the engine is driven.

8. The method of claim 5, wherein the predetermined minimum oil pressure is preset as a minimum oil pressure for the parking piston to maintain the release of the parking gear stage.

9. The method of claim 1, further including:
before the starting to drive the parking release device, periodically receiving oil pressure information related to the parking piston when the oil pressure of the parking piston is lower than a predetermined reference oil pressure and determining whether the oil pressure of the parking piston is lower than the predetermined minimum oil pressure using the received oil pressure information related to the parking piston,
wherein, in the starting to drive the parking release device, when the controller determines that the oil pressure of the parking piston is lower than the predetermined minimum oil pressure, the controller is configured to start to drive the parking release device.

10. The method of claim 9, further including:
before the starting to drive the parking release device, estimating an oil pressure removal timing at which the oil pressure of the parking piston is completely removed using the received oil pressure information related to the parking piston,
wherein, in the starting to drive the parking release device, the controller is configured to start to drive the parking release device before the estimated oil pressure removal timing.

11. The method of claim 9, wherein the predetermined reference oil pressure is preset as a minimum oil pressure maintained at the parking piston while the engine is being driven.

12. The method of claim 9, wherein the predetermined minimum oil pressure is preset as a minimum oil pressure for the parking piston to maintain the release of the parking gear stage.

13. The method of claim 1, wherein the controlling of the ON/OFF duty ratio of the electric power of the parking release device is controlling to increase the ON/OFF duty ratio until the oil pressure of the parking piston is equal to or greater than a predetermined minimum oil pressure.

14. The method of claim 13, further including:
boosting the electric power for driving the parking release device, when the ON/OFF duty ratio of the parking release device is increased to 100% in the controlling of the ON/OFF duty ratio of the electric power.

15. The method of claim 1, wherein the controlling of the ON/OFF duty ratio of the electric power of the parking release device is controlling to reduce the ON/OFF duty ratio when the oil pressure of the parking piston exceeds a predetermined minimum oil pressure.

16. The method of claim 1, wherein the parking release device is an electric oil pump (EOP) providing oil pressure to the parking piston or a parking release actuator (PRA) providing power to a parking release lever for preventing the release of the parking gear.

17. The method of claim 1, further including:
detecting when a re-starting condition is met, after the controlling of the ON/OFF duty ratio of electric power; and
when the re-starting condition is met, terminating driving of the parking release device on a basis of the oil pressure of the parking piston or the RPM of the engine.

* * * * *